_United States Patent_ [19]

Leeman et al.

[11] 3,929,756

[45] Dec. 30, 1975

[54] SYNTHETICALLY PRODUCED TRIDECAPEPTIDE HAVING THE SAME ACTIVITY AS THE HYPOTHALAMIC SUBSTANCE, NEUROTENSIN

[75] Inventors: Susan E. Leeman, Newton; Robert E. Carraway, Brockton, both of Mass.

[73] Assignee: Brandeis University, Waltham, Mass.

[22] Filed: Nov. 21, 1973

[21] Appl. No.: 417,816

[52] U.S. Cl............................ 260/112.5 R; 424/177
[51] Int. Cl.$^2$................. C07C 103/52; A61K 37/00
[58] Field of Search.................................. 260/112.5

[56] References Cited
OTHER PUBLICATIONS

Carraway: Dissert. Abstr. Int. B, 33, 3449–3450 (1973).

J. M. Stewart and J. D. Young, "Solid Phase Peptide Synthesis," Freeman and Co., San Francisco (1969), pp. 1–26.

_Primary Examiner_—Lewis Gotts
_Assistant Examiner_—Reginald J. Suyat
_Attorney, Agent, or Firm_—Salvatore C. Mitri

[57] ABSTRACT

A hypotensive peptide, designated neurotensin, has been discovered and isolated in pure form from acid-acetone extracts of bovine hypothalami by column chromatography and paper electrophoresis. Based upon this discovery, a tridecapeptide has been chemically synthesized having the activity of this hypothalamic substance.

6 Claims, No Drawings

SYNTHETICALLY PRODUCED TRIDECAPEPTIDE HAVING THE SAME ACTIVITY AS THE HYPOTHALAMIC SUBSTANCE, NEUROTENSIN

This invention relates to the discovery of the hypothalamic substance, neurotensin, and to the synthesis of a tridecapeptide having the same activity as this hypothalamic substance.

BACKGROUND OF THE INVENTION

No prior art is known relating to the hypothalamically derived substance, herein designated as neurotensin, nor to the chemical synthesis of a tridecapeptide which exhibits the same activity of neurotensin.

THE INVENTION

It was found that acid-acetone extracts of bovine hypothalami contained a substance which produced cyanosis upon intravenous injection into rats. No substance was known that could reproduce this effect and isolation of the responsible factor was undertaken. This led to the isolation, in pure form, of the hypothalamic substance, neurotensin. In an attempt to elucidate the amino acid sequence of this substance, the tridecapeptide of this invention was chemically synthesized and it was found to exhibit the same activity as the isolated, pure neurotensin.

This tridecapeptide has been synthesized from the following nine amino acids:

| | |
|---|---|
| Pyrrolidonecarboxylic acid | (PCA) |
| Leucine | (Leu) |
| Tyrosine | (Tyr) |
| Glutamate | (Glu) |
| Asparagine | (Asn) |
| Lysine | (Lys) |
| Proline | (Pro) |
| Arginine | (Arg) |
| Isoleucine | (Ileu) | and the amino acid sequence of this tridecapeptide is PCA-Leu-Tyr-Glu-Asn-Lys-Pro-Arg-Arg-Pro-Tyr-Ileu-Leu-OH.

The physiological and biological functions of this tridecapeptide have been found useful for inducing hypotension, stimulating the contraction of the ileum and uterus, and inducing relaxation of the duodenum in mammalian species.

Further details of the isolation of neurotensin and chemical synthesis of the tridecapeptide of the invention will become more apparent from the ensuing discussion.

SECTION A

Isolation and Characterization of Neurotensin From Bovine Hypothalami

Materials:

Tissues: Commercially obtained bovine hypothalami, excized within an hour after slaughter, were frozen immediately on dry ice. The tissue fragments, extending from the optic chiasm to the mamillary bodies, each weighed about 8–10 grams (g).

Chromatographic Materials: Commercially obtained Sephadex resins, silica gel-G plates and chromatography papers.

Enzymes: Commercially obtained trypsin (250 units/mg (U/mg)), treated with L-(tosylamido-2-phenyl) ethyl chloromethyl ketone (TPCK) and alpha-chymotrypsin (45 U/mg) were stored as 1% solutions at $-5°C$. Other commercially obtained products were as follows: diisopropylphosphofluoridate (DFP)-treated carboxypeptidase A (35 U/mg), DFP-treated carboxypeptidase B, thermolysin (A grade), and pronase (1 U/mg). Acquired five-times recrystallized papain was assayed and found to have a specific activity of 16 U/mg using benzoyl-L-arginine-methyl ester as substrate according to known procedures.

Reagents: Unless indicated otherwise, all reagents were Fisher certified products.

Methods:

Analytical Procedures

Gel Chromatography and Ion Exchange Chromatography:

The Sephadex G-25 and sulfoethyl-(SE)-Sephadex C-25 were prepared as recommended by the manufacturer. Descending gel chromatography was carried out at a flow rate of 0.3–0.5 ml per min. per $cm^2$ at room temperature or at 4°C. Linear gradient elution of ion exchange columns was performed, the column eluates being monitored by measuring their absorbance at 280 or 300 millimicrons (m$\mu$) with a Zeiss spectrophotometer. Protein concentrations of column eluates were expressed as units of optical density at 280 m$\mu$ with the assumption that one optical density unit represented 1 mg protein/ml.

High Voltage Paper Electrophoresis:

High voltage paper electrophoresis was performed on Whatman 1 or Whatman 3 MM paper using a Michl type electrophoresis apparatus at 80 volts (V) per cm with Varsol as an inert cooling medium. The buffer systems consisted of (1) pH 1.9; formic acid: acetic acid: water (150:100:750), (2) pH 3.5; pyridine: acetic acid: water (4:40:760), (3) pH 6.5; pyridine: acetic acid: water (80.2.4:720), and (4) pH 8.9; 1% ammonium carbonate in water. For preparative electrophoresis, the Whatman papers were washed with 20% pyridine and then 20% acetic acid for several days before use and samples were applied to the paper in 0.2 M acetic acid, 0.01 M mercaptoethanol so as not to exceed a load of 0.1 mg protein per cm and 1.0 mg protein per cm on the Whatman 1 and Whatman 3 MM papers, respectively. Standard amino acids (10 nmoles each) were spotted on both sides of the samples and peptides were located by staining a guide strip with ninhydrin-cadmium acetate reagent or with chlorine-tolidine. Strips measuring 1.5–2.0 cm in width of unstained paper sections were eluted with 1–2 mls of 0.2 M acetic acid and 0.01 M mercaptoethanol. After lyophilization, samples were diluted into 0.85% saline for biological testings, and the electrophoretic mobility of neurotensin was calculated relative to lysine according to the method of Offord.

Amino Acid Analysis:

Amino acid analyses were performed with the aid of a Beckman model 120C automatic amino acid analyzer equipped with a high sensitivity adapter (precision of ±3% on a 2–10 nmole range). Samples of peptides of between about 5–10 nmoles were routinely hydrolyzed with 0.25 mls of constant-boiling HCl in evacuated, sealed tubes at 109°C for 20–40 hours. Although tyrosine losses during acid hydrolysis have been reported to be about 10% in 24 hrs., it was found that at very low concentrations, tyrosine can be degraded at 5-fold this rate. The destruction rate is enhanced when the sample is first eluted from paper and impeded in the presence of phenol. Therefore, to minimize destruction of tyrosine, 25 micro liters (μl) of 0.1M phenol was added to some tubes and for those analyses where phenol was not present, tyrosine values were calculated from a time curve of the destruction extrapolated to zero time. In order to quantitate the amounts of cysteine, cystine and methionine in the peptide, performic acid oxidation was performed as described, the dried sample being oxidized for 12 hours at 0°C. with 0.25 mls of performic acid reagent, diluted with cold water, lyophilized and acid hydrolyzed for amino acid analysis. Spectral analyses of the pure peptide were performed on a Cary model 15 recording spectrophotometer to quantitate tyrosine and tryptophan content.

Dansylation Procedure:

1-Dimethylamino-naphthalene-5-sulfonyl (DNS) chloride was used to determine the N-terminal residue. The DNS peptide was hydrolyzed in constant boiling HCl at 105°C for 4 hrs. and 20 hrs. and then examined by two dimensional chromatography on 5 × 5 cm sheets of polyamide using four solvent systems.

Enzymatic Procedures:

Enzymatic digestions were carried out by incubating 10 doses of pure peptide with a 1/50 molar ratio of enzyme at 38°C for 4 hours in 0.1 ml of the appropriate buffer. The buffer systems were as follows: pronase — 0.05 Tris(hydroxy methyl)-aminomethane-HCl (Tris-HCl) pH 7.6; papain — 0.20 M ammonium acetate pH 5.6; 0.03 mercaptoethanol; thermolysin — 0.20 M $NH_4HCO_3$, pH 8.2; alpha-chymotrypsin, trypsin, and carboxypeptidase A and B — 0.10 M $NH_4 HCO_3$, pH 7.8; leucine aminopeptidase — 0.05 M sodium barbital, pH 8.5, 0.01 M $MgCl_2$; aminopeptidase-M — 0.06 M sodium phosphate, pH 7.8. Control solutions consisted of active peptide incubated with enzyme that had been boiled for 5 min. The reactions were terminated by adding 3 drops of acetic acid following which the samples were lyophilized, dissolved in 0.85% saline, and tested in rats for their vasodilatory and hypotensive activity. In those cases where enzymatically released free amino acids were determined, approximately 200 doses of pure neurotensin were used per digest and analyses were performed on the amino acid analyzer.

Biological Procedures:

Testings for the sialogogic activity of substance P (see pending U.S. patent application Ser. No. 268,679, filed July 3, 1972) were performed, one sialogogic dose being that amount of material that stimulates the secretion of 50 ± 10 μl of saliva when injected intravenously into an anesthesized, 100 g rat. The biological activity of neurotensin was monitored by observing the characteristic vasodilation of the exposed cutaneous regions of anesthesized rats that occurs within seconds following intravenous injection of the samples. The intensity and duration of the response was noted and a minimal active dose was determined. Since this vasodilation was found to be associated with a transient fall in blood pressure, a dose of peptide was defined as that amount of material per 100 g of body weight which, when given intravenously to an anesthesized rat, caused a fall in blood pressure of 35 ± 5 mm Hg. Systemic blood pressure was measured with a Hewlett Packard recorder and pressure transducer following cannulation of the carotid artery in rats weighing 250–300 g and anesthesized with pentobarbitol (Nembutal) (45 mg per kg). Test samples were dissolved in 0.85% saline and administered through a cannula in the femoral vein.

ISOLATION OF NEUROTENSIN

Extraction of Tissues:

The frozen tissue weighing about 20–45 kg was homogenized to a uniform consistency with an equal volume of −20°C acetone: 1 N HCl (100:3 v/v) in a Gilford Wood colloid mill following which 3 more volumes of this solvent were added and the suspension was stirred overnight at 4°C. The mixture was then suction filtered through Whatman No. 31 paper on Buchner funnels and the filtrate set aside. The residue was resuspended in a volume of acetone: 0.01 N HCl (80:20 v/v) that was 2 times the original volume of the tissue and filtered as above. The 2 filtrates were pooled and repetitive petroleum ether extraction of the combined filtrates to remove lipids as well as acetone was performed as follows: the filtrate was mixed at 4°C with one-third its volume of petroleum ether (b.p. 36°–50.9°), the ether acetone phase was discarded, and the process repeated 3–4 times until the discarded phase was transparent. The acetone-water phase was then flash evaporated in a water bath at a temperature of about 35°–45°C. to remove acetone and the aqueous residue was finally lyophilized.

Chromatography on G-25 Sephadex:

Fractionation of the extracted tissues was performed in two successive steps on a 20 liter and a 5 liter column of Sephadex G-25 fine. The activity of neurotensin is masked at this stage, but substance P, a sialogogic undecapeptide also present in these tissues, occupies the same region and was used as a marker. The lyophilized extract was taken up in 0.1 M acetic acid (600 ml/22 kg hypothalamic substance) and, after its pH was adjusted to 4, the suspension was centrifuged at 10,000 × gravity (g) for 20 min. at 4°C. The supernatant was put aside and the precipitate was resuspended in 0.1 M acetic acid (400 mls/20 kg hypothalamic substance) and recentrifuged. The combined supernatant fluid was then appied to a 20 liter column of Sephadex G-25 fine which was equilibrated with 0.1 M acetic acid at 4°C and the column eluates screened for sialogogic activity. Material from the active region was pooled, lyophilized, taken up in 0.1 M acetic acid (100 ml/20 kg hypothalamic substance) and rechromatographed on a 5 liter column kept at room temperature. Again the active region was pooled and lyophilized.

Cation Exchange Chromatography

The chromatographed material was then subjected to ion exchange chromatography on SE-Sephadex C-25, using pyridine-acetate buffers. Material representing 22 kg of hypothalamic tissue (about 800 mg protein) was taken up in 200 ml of 0.05 M pyridine-acetate buffer (pH 3.1) and was applied at room temperature to a 50 ml column of SE-Sephadex equilibrated with this buffer. The column was developed with a linear gradient which was generated by using 750 ml of 0.05 M pyridine-acetate (pH 3.1) in the mixing chamber and 750 mls of 2.0 pyridine-acetate (pH 5.5) in the reservoir. The protein concentration of the eluates was monitored at 280 and 300 mμ and neurotensin activity, which was unmasked by this fractionation step, was located by the visual vasodilation method. The active region was pooled, lyophilized and the doses of neurotensin present were quantitated using the rat blood pressure method. Material pooled from two of these columns of SE-Sephadex and representing 45 kg of hypothalamic tissue was applied in 100 ml of 0.01 M pyridine-acetate (pH 5.5) to a 10 ml column of SE- Sephadex which was then developed with a linear gradient made from 1.0 L of 0.01 M pyridine-acetate (pH 5.5) and 1.0 L of 0.3 M pyridine acetate (pH 5.5).

Preparative Paper Electrophoresis:

High voltage paper electrophoresis at pH 3.5 on Whatman 3 MM was used as the final preparative step. After the second ion exchange column, the active material from 45 kg hypothalamic tissue (about 10 mg protein) was applied in a 10 cm band to Whatman 3 MM paper and electrophoresed. That material which was recovered from region G (50% of the activity) was found to be a pure peptide. The remainder of the activity can be recovered as a pure peptide by further electrophoresis at either pH 6.5 or pH 8.9. Neurotensin has an electrophoretic mobility relative to lysine of 0.4, 0.2, and 0.3 at pHs 3.5, 6.5, and 8.9, respectively.

Results:

Purification and Yields:

Following this procedure, the extracted peptide was purified ca 200,000 fold. Approximately 3–5 nmoles of pure neurotensin can be obtained per kg of wet tissue. Assuming a 75% yield through the initial gel chromatography steps, it was estimated that there were about 20 nmoles of this peptide per kg tissue in the initial extract. Since re-extraction of the initial precipitate with acetone: 0.01 M HCl (60:40 v/v) yields more of a vasodilatory peptide that probably is neurotensin, there may be as much as 35 nmoles neurotensin present per kg of hypothalami. Thus, on a molar basis the concentration of neurotensin in bovine hypothalami would only be about 30–50% that of substance P and that of Luteinizing Hormone Releasing Hormone (LHRH).

Table 1 summarizes the results of a typical purification procedure starting with 45 kg of bovine hypothalami.

HOMOGENEITY AND COMPOSITION

It is believed that the biologically active peptide obtained is homogeneous. The material obtained after electrophoresis at pH 3.5 was found to exhibit a single stainable peptide during electrophoresis at pH 6.5 and when the isolated peptide was dansylated and chromatographed on silica-gel-G, only one fluorescent peptide spot was visible having an $R_f=0.68$ using butanol:pyridine:acetic acid:water (15:10:3:12) and an $R_f=0.52$ using butanol:acetic acid:water (4:1:1). The molar ratios of the constituent amino acids are integral and remain constant after electrophoresis at pHs 3.5, 6.5 and 8.9. Furthermore, the biological specific activity also remained constant after re-electrophoresis while spectrophotometric analyses of the peptide confirmed the presence of two moles of tyrosine per mole of peptide and showed the absence of tryptophan. The absence of cysteine (cystine) and methionine was established by amino acid analysis of 4 nmoles of pure peptide that had been subjected to performic acid oxidation. From this analysis, the following molar ratios were obtained: cysteic acid (0), methionine sulfone (0), aspartic acid (1.05), glutamic acid (2.0), proline (2.0), isoleucine (0.8), leucine (1.8), tyrosine (not determined (nd)), lysine (nd), arginine (nd). Table 2 summarizes the molar ratios of the amino acids in neurotensin after electrophoresis.

ESTIMATION OF MOLECULAR WEIGHT OF NEUROTENSIN

The elution position of the isolated neurotensin was measured by vasodilatory activity relative to a number of other peptides of known molecular weight. The apparent molecular weight of neurotensin obtained from this plot was found to be 1600 while the minimum molecular weight of the isolated hypothalamic substance, as calculated from its amino acid composition, was found to be 1673.

END GROUP DETERMINATIONS

Neurotensin was found to lack a free $NH_2$-terminus. Chromatography of the acid hydrolysates of dansylated neurotensin yielded only DNS-O-tyrosine ad DNS-E-lysine and no DNS-alpha-amino derivatives, indicating that the alpha-amino group of the $NH_2$-terminal residue is blocked. In addition, it was found that enzymatic digests of 10 nmoles of peptide with leucine aminopeptidase and 4 nmoles of peptide with aminopeptidase M did not release any free amino acids and did not destroy biological activity. Incubation of 10 nmoles of pure peptide with carboxypeptidases A and B released stoichiometric amounts of leucine, isoleucine and tyrosine and destroyed its biological activity indicating that the COOH-terminus is free.

ENZYMATIC STUDIES

Incubation of biologically active material with the relatively nonspecific endopeptidases, pronase and papain, as well as enzymes with a high substrate specificity such as trypsin, chymotrypsin and termolysin destroyed its ability to produce vasodilation and to lower blood pressure in rats. These results suggest that the biologically active substance is, at least in part, a peptide and that the peptide contains basic (e.g., Lys, Arg), aromatic (e.g., Tyr), and bulky aliphatic (e.g., Illeu, Leu) residues. The amino acid composition of the isolated, pure peptide is consistent with these findings.

SECTION B

Determination of Sequence of Amino Acids in Isolated Neurotensin

The determination of the sequence of the amino acids which comprise neurotensin was accomplished following known procedures and using ure neurotensin obtained from three 45 kg preparations of hypothalami, amounting to a total of about 0.3μ, moles of peptide. The scarcity of pure material necessitated that methods be used which could detect nmolar quantities of amino acids. Several of the basic techniques of sequence determination have attained this level of sensitivity.

Materials

Enzymes:

Trypsin, alpha-chymotrypsin, carboxypeptidase A, and carboxypeptidase B were the same preparations described in Section A above.

Leucine aminopeptidase (209 U/mg), prolidase (31.5 U/mg), and aminopeptidase M (0.2 U/mg) were commercially obtained while pyrrolidonecarboxylyl peptidase, derived from bacillus subtilis, was donated from an outside source.

Edman Reagents:

Pyridine, phenylisothiocyanate, anhydrous trifluoroacetic acid, and butyl acetate were commercially obtained sequential grades.

Dansyl Reagents:

Dansyl-Cl and polyamide sheets were commercially obtained. All other reagents used in thin layer chromatography were Fisher reagent grade.

Methods

Enzymatic Digestions

All enzymatic digestions were performed at a water bath temperature of 38°–40°C for the times specified hereinbelow. The reactions were stopped by addition of 2 drops of acetic acid and the incubates were dried under vacuum in a desiccator over NaOH pellets.

When the digest was examined for free amino acids liberated from peptides, control incubations of proteolytic enzymes alone were carried out in parallel in order to determine the quantities of amino acids resulting from autolysis.

Trypsin and Chymotrypsin

Digestions of peptide with trypsin or chymotrypsin were performed in 0.2 M ammonium bicarbonate buffer, pH 8.2, at enzyme/substrate molar ratios of 1/100. Peptides derived from tryptic and chymotryptic digests or neurotensin are identified by the perfixes "T-" and "C-", respectively, and are numbered consecutively according to their position in the polypeptide chain.

Carboxypeptidases A and B

Both carboxypeptidase preparations were pretreated with diisopropylphosphoflouridate (DFP) to inhibit traces of "serine" proteases. Carboxypeptidase A (CPA) was washed according to known methods while carboxypeptidase B (CPB) was used as obtained. Peptides were routinely incubated overnight in 0.1 M ammonium bicarbonate, pH 8.0, with 1/50 molar ratio of enzyme/substrate.

Leucine Aminopeptidase and Aminopeptidase M

N-terminal analyses using leucine aminopeptidase (LAP) were carried out in 0.05 M barbital buffer, pH 8.5, 0.01 M $MgCl_2$, at an enzyme/substrate weight ratio of ½. Aminopeptidase M (APM) was employed in 0.06 M sodium phosphate buffer, pH 7.8 using an enzyme/substrate weight ratio of 1/5.

Pyrrolidonecarboxylyl Peptidase

The hydrolysis of peptides with pyrrolidonecarboxylyl peptidase (PCA-ase) followed a modified procedure using 0.1 mM peptide in 0.2 M ammonium bicarbonate buffer, pH 7.65, 0.03 M mercaptoethanol, 0.001 M disodium ethylenediaminetetraacetic acid (EDTA) with 0.03 mg/ml of enzyme. The ability of the enzyme to release alanine from synthetic PCA-alanine was always examined quantitatively during each digest. The specificity of this enzyme is such that it removes only the N-terminal pyrrolidonecarboxylic acid (PCA) residue from a peptide or protein; it displays no activity toward N-terminal glutamic acid nor N-acetyl-glutamic acid; and, no evidence of autolysis or endopeptidase activity was noted.

"Total Enzymatic" Digestions

Complete enzymatic digestion of neurotension was attempted utilizing papain and APM in sequence. Peptide, at a concentration of 100 μg/ml was incubated with 1/20 times its weight of papain for 2 hours at 38°C. in 0.05 M ammonium acetate, pH 5.3, and 0.02 M mercaptoethanol. Papain was inactivated by the addition of 3 drops of acetic acid and the mixture was lyophilized. The partially digested peptide was then incubated with 2 times its weight of APM plus 1/5 its weight of prolidase for 3 hours at 38°C. in 0.2 M ammonium bicarbonate, pH 8.2, and 0.02 M mercaptoethanol. Digestions of the synthetic peptides, substance P, bradykinin, and physalaemin, served as controls.

Dansyl-Edman Method

The Edman degradation was performed on 5–20 nmole quantities of peptide. Synthetic bradykinin and substance-P served as control peptides. After each Edman degradation cycle, an aliquot of the residual peptide was removed for amino terminal analysis by the dimethylaminonaphthalenesulfonyl (DNS) procedure. The DNS-peptides were hydrolyzed in redistilled constant boiling HCl at 109°C. for 4 hours and 20 hours and examined by 2-dimentional chromatography on 5 × 5 cm sheets of polyamide using 4 solvent systems. Dansyl-amino acid standards were also prepared. In some cases, the phenylthiocarbamyl (PTC) amino acid was identified directly after reversion to the amino acid. 250 nmoles of PTC-glycine was added to the N-butylacetate extracts of each Edman degradation cycle and the solvent was distilled into paraffin wax in vacuo. After 1.5 mls of deoxygenated (6 hours argon bubbling), 0.1 N NaOH was added to each sample, the tubes were evacuated, sealed, and left overnight at 110°C. The hydrolysates were acidified with 0.1 N HCl and flash evaporated. After filtration through millipore filters (Swinnex 45μ pore size), the resulting amino acids were quantitated utilizing a commercial amino acid analyzer. In some cases, Edman products were identified indirectly by subjecting the residual peptide to acid hydrolysis and amino acid analysis to identify the missing residue.

Amino Acid Analysis

Amino acid analyses were performed as described in Section A, above, except that acid hydrolyses were always done in the presence of phenol.

Measurements of Electrophoretic Mobilities

Peptide electrophoretic mobilities were calculated and are expressed relative to the standards, serine (pH 1.9), aspartic acid (pH 6.5), or lysine (pHs 3.5, 8.9). At pHs 3.5, 6.5 and 8.9, the effect of endosmosis was subtracted by considering the point of zero mobility to be the mid-point of the position of the neutral amino acid, isoleucine. The positions of the leading edges of the migrating peptides or standards were recorded and used in calculating the relative mobilities. Occasionally, the mobility at pH 6.5 was measured relative to lysine and given relative to aspartic acid. This calculation was performed using the relationship, mobility of aspartate $(M_{Asp}) = 0.93 \times$ mobility of lysine $(M_{Lys})$, which was derived from the average of 3 experiments done at pH 6.5.

Results:

Evidence for a Blocked N-terminus

Neurotension was found to lack a free alphaamino terminus by several methods. Chromatography of the acid hydrolysates of dansylated neurotensin yielded only DNS-O-tyrosine and DNS-E-lysine and no DNS-alpha-amino derivatives which indicates that the alpha-amino group of the N-terminal amino acid is blocked. To confirm this, 10 nmoles of pure peptide was subjected to two cycles of the Edman degradation and the amino acid composition of the residual peptide determined after acid hydrolysis and the intact peptide was retrieved in a 70% yield. The following molar ratios were obtained: lysine (0.5), arginine (1.8), aspartic acid (1.35), glutamic acid (1.9) proline (1.8), isoleucine (0.9), leucine (1.9), and tyrosine (1.7). These low yields of lysine and tyrosine in the subtractive Edman procedure, were attributed to apparent losses of these amino acids due to the formation of PTC — derivatives of their side chains. Additional evidence that the amino terminus is blocked was derived from enzymatic digests of 10 moles of peptide with LAP and 4 moles of peptide with APM, both of which did not release any free amino acids.

Determination of N-terminal Sequence

The results of several experiments involving the specific enzyme, PCAase, established that a pyrrolidone carboxylic acid (PCA) residue occupies the N-terminal position of neurotensin. When 10 nmoles of pure neurotensin were digested with PCAase followed by treatment of the incubate with the enzyme, APM, a 75% yield was obtained of the following free amino acids as determined on the amino acid analyzer: leucine (1.0), tyrosine (1.0), and glutamic acid (0.65). Since PCA does not react with ninhydrin, free PCA was not quantitated. This result indicated that these amino acids lie near to the N-terminal PCA residue and established that the internal glutamic acid or glutamine ("Glx") is present in the glutamic acid form.

The N-terminal sequence of neurotensin was established as PCA-Leu-Tyr-Glu-Asx by digestion of 18 nmoles of pure peptide with the enzyme, PCAase, and subsequent application of the dansyl-Edman procedure. Both dansyl and Edman products were identified through 4 cycles of the Edman degradation and, in addition, the residual material was subjected to amino acid analysis. The results of these experiments are summarized in Table 3.

That PCAase cleaved the peptide chain in only one place is evidenced by the single dansyl and Edman products identified after each step. Provided a single cleavage occurred, the subtractive analysis can be interpreted as indicating a 90% yield in the enzymatic removal of the pyrrolidone end group followed by consecutive removal of 0.9 residues of Leu and Tyr, 0.8 residue of Glu and 0.4 residue of aspartic acid or asparagine ("Asx"). The fact that Glu-4 was nearly quantitatively liberated by the Edman procedure corroborated the finding that it is in the free acid form. It is a common occurrence that N-terminal glutaminyl (Gln) residues undergo ring closure to the PCA-form under the conditions of the Edman degradation, rendering the peptide resistant to this procedure.

Carboxyl-terminal Sequence

Treatment of 10 nmoles of the intact peptide with anhydrous hydrazine identified the C-terminal amino acid (15% yield) to be leucine. The C-terminal sequence of the peptide was determined to be -Tyr-Ileu-Leu-COOH by kinetic experiments using CPA and CPB. Exactly 1.0 mole of each of these amino acids was released per mole of peptide which confirmed the homogeneity of this preparation.

Sequence Studies on Tryptic and Chymotryptic Fragments of Neurotensin a. Tryptic Peptides Digestion of neurotensin with trypsin yielded 2-peptide fragments which were separable by high voltage paper electrophoresis at pH 3.5 or pH 6.5. After electrophoresis, these peptides can be eluted from the paper in pure form. This was established by the fact that the molar ratios of their constituent amino acids were integral and the same when isolation was carried out at pH 3.5 or 6.5 as shown in Table 4. The sum of the amino acid compositions of the 2 fragments accounts for the entire composition of neurotensin. Dansylation of peptide T-2 established that its N-terminus is arginine, while peptide T-1 was found to lack a free alpha-amino function, it being noted that this peptide stains with ninhydrin by virtue of its lysine residue.

i. Sequence of Peptide T-2

When 6 nmoles of the peptide T-2 were subjected to 3 cycles of the Edman degradation, while alpha-amino-terminal analyses were performed by the dansyl procedure, it was clearly established that the amino acid sequence of this peptide was as follows: H-Arg-Pro-Tyr-Ileu-Leu-OH. This was in complete agreement with the data obtained from CPA digestion of intact neurotensin.

ii. Sequence of Peptide T-1

The blocked N-terminus precluded the use of the dansyl-Edman procedure on this fragment; however, carboxy-terminal analysis established arginine as the C-terminal residue. Digestion of 10 nmoles of peptide T-1 with CPA and CPB released arginine as the only free amino acid (95% yield). Dansylation of the incubate also indicated the absence of other amino acids besides arginine.

b. Chymotryptic Peptides

Chymotrypsin cleaved adjacent to the tyrosine residues in neurotensin, giving rise to 3 peptide fragments. The chymotryptic incubate of neurotensin was electrophoresed at pH 3.5 or pH 6.5 and the paper stained with ninhydrin or with chlorine-tolidine. Since the peptide C-1 contains the N-terminal PCA residue (and no lysine), it does not stain with ninhydrin; however, it does stain with chlorine-tolidine which is sensitive to the peptide bond. After electrophoresis at either pH, these 3 fragments were obtained in pure form, as evidenced by the fact that the molar ratios of their constituent amino acids are integral as shown in Table 5.

As can be seen from Table 5, the sum of the amino acid compositions of the 3 fragments accounts for the entire composition of neurotensin.

i. Sequence of Peptide C-1

The results of the sequence analysis of peptide C-1 are summarized in Table 6.

CPA treatment of 6 nmoles of peptide released only tyrosine (95% yield). CPA digestion of 10 nmoles of peptide followed by PCAase treatment released both leucine (85% yield) and tyrosine (90% yield). These results determined the sequence of the C-1 peptide to be: PCA-Leu-Tyr-OH, which is in complete agreement with the previously determined N-terminal sequence of intact neurotensin.

ii. Sequence of Peptide C-3

One cycle of the Edman degradation performed on 6 nmoles of peptide C-3 and amino acid analysis of the residual peptide clearly established the sequence, H-Ileu-Leu-OH.

iii. Sequence of Peptide C-2

CPA and CPB digestion of intact peptide C-2 established tyrosine as the C-terminal residue. When the C-2 fragment was first digested with trypsin and then with CPA and CPB, arginine and tyrosine were released, confirming that the site of tryptic cleavage of neurotensin lies within the C-2 fragment. Thus, the sequence of the right half of the peptide C-2 was inferred from that of peptide T-2.

The N-terminus of peptide C-2 was determined to be glutamic acid by dansylation of the chymotryptic incubate which gave the alpha-amino dansyl products, Glu and Ileu. This was necessary because, after electrophoretic isolation of the C-2 fragment, it proved refractory to the dansyl procedure. This suggested that the N-terminal Glu is susceptible to cyclization to the PCA form under the conditions of high voltage paper electrophoresis. In support of this, it was found that the isolated C-2 fragment was partially resistant to the Edman degradation. When 10 nmoles of the isolated C-2 fragment were subjected to 1 cycle of the Edman degradation and the amino acid composition of the residual material analyzed, it was found that 0.5 residues of Glu remained. Thus, it was clear that further sequence attempts on the isolated C-2 fragment would not be fruitful.

Therefore, the sequence of the yet undefined residues in the C-2 fragment was determined in the presence of the other chymotryptic fragments. When 14 nmoles of the T-1 peptide were incubated with chymotrypsin and then followed by the kinetics of LAP digestion, the results showed a nearly simultaneous release of glutamic acid, asparagine, and lysine in equal quantities. A confirmation of these results was obtained in a separate experiment in which neurotensin, previously treated with chymotrypsin, was digested with LAP, yielding Ileu and Leu in addition to Glu, Asn, and Lys. This data established that the Asx residue was present in the amide form and is in complete accord with the results of a dansyl-Edman analysis which directly determined the N-terminal sequence of the C-2 fragment as H-Glu-Asn-Lys.

Twenty-one nmoles of neurotensin were digested with chymotrypsin and the products subjected to 3 successive cycles of the dansyl-Edman procedure. Both the dansyl and Edman products were identified and, in addition, amino acid analyses of the residual material was performed after 2 and 3 cycles. When taken in conjunction with previous data these results established the sequence of the C-2 fragment as: H-Glu-Asn-Lys-Pro-Arg-Arg-Pro-Tyr-OH, Proline-4 being placed by elimination.

Proposed Sequence of Neurotensin

The structural formula for neurotensin deduced from these data is presented in Table 7 along with a summary of the accumulated evidence upon which it is based. These data permit an unambiguous placement of each of the 13 amino acids comprising neurotensin. Furthermore, the enzymatic studies suggest that all the component amino acids are in the L-configuration. Every bond linking 2 amino acids in neurotensin or one of its fragments, except Arg (9) - Pro (10), has been digested by an enzyme specific for the L-configuration.

Net Charge Measurements by Electrophoresis

The net charge of neurotensin and its fragments was measured at several pHs. It was found that the net charge determined for each of these peptides was consistent with its proposed structure which is also shown in Table 7.

It is an empirical fact that a log-log plot of the electrophoretic mobility (m) at constant pH versus molecular weight (mw) for peptides of a given charge (e) yields a straight line. Since m is roughly proportional to e when mw is constant, then peptides carrying e equal to ±1, ±2, ±3, ±4 would give rise to 4 parallel straight lines in such plots. Knowing the mw of a peptide, one can determine e at a given pH by measuring m. From measurements at pH 1.9 and pH 6.5, where peptides usually possess integral charges, one can best decide if a proposed structure for a peptide is compatible with its electrophoretic behavior. The proposed structure for neurotensin and its fragments are listed in Table 7 along with the net charges predicted for each molecule at pH 1.9 and pH 6.5.

The data summarized in Table 7 indicate that the net charges of these peptides at pH 1.9 and pH 6.5 derived from mobility measurements are as expected for the proposed structures.

Total Enzymatic Digestion

The results of total enzymatic digestion of neurotensin were found to be consistent with the presence of one Asn residue and confirmed the fact that the constituent amino acids are in the L-configuration. When an 8 nmole sample of neurotensin was enzymatically digested with the endopeptidase, papain, followed by the exopeptidase, APM, the following amino acids were liberated in a 90% yield: Lys (1.0), Arg (2.2), Asn or Gln (1.2), Glu (0.2), Pro (1.8), Ileu (0.9), Leu (1.1), and Tyr (0.8). This data can be interpreted as indicating a total digestion of all but the N-terminal peptide fragment, PCA-Leu-Tyr-Glu. The resistance of this fragment is believed to be attributable to its lack of an amino terminus. The L-configuration for these 4 amino acids was previously established by enzymatic digestion with PCAase followed by APM.

SECTION C

Synthesis of a Tridecapeptide Having the Activity of the Hypothalamic Substance, Neurotensin Although neurotensin can be isolated, as has been demonstrated above, it occurs only in trace amounts and is costly and time consuming to isolate and purify yielding only minute amounts. It would therefore be highly desirable to be able to synthesize a compound having the same activity as neurotensin to provide an inexpensive, less time consuming and a more plentiful source of this trace material in order to make possible the utilization of its physiological function. Because of its rapidity and simplicity, the Merrifield, solid phase method of synthesis, as described by Stewart and Yound (Solid Phase Peptide Synthesis (1969)), was used.

Materials

Chloromethylated resin, 1% or 2% cross-linked styrene-divinyl benzene copolymer with 2.7 meq chloride per g, was employed.

Butyloxycarbonyl-(Boc-)-L-amino acids, Boc-L-amino acid p-$NO_2$-phenyl active esters, and N,N-dicyclohexyl carbodiimide (DCC) were commercially obtained products. The melting points and thin layer chromatographic behavior of all amino acid derivatives and the optical purity of Boc-L-tyrosine were determined prior to use.

Lecture bottles of HCl and HBr gas, 5% palladium on barium sulfate, trifluoroacetic acid (TFA), and triethylamine ($Et_3N$) were all commercially obtained reagent grade products. Methylene chloride ($CH_2Cl_2$), N,N-dimethylformamide (DMF), ethanol (EtOH), pyridine, and dioxane were all Fisher certified solvents. DMF was purified by passage through a column of 4 Angstrom molecular sieves and then stored a few days over these sieves prior to use.

Methods

Esterification of the First Amino Acid to the Resin:

To 5.0 g. of chloromethylated, styrene-divinyl benzene copolymer (2% crosslinked with 2.7 meg chloride per gram) was added 30 mls of dimethyl formamide, 7.5 m moles of butyloxycarbonyl leucine (Boc-Leu), and 6.8 m moles of triethylamine. The mixture was shaken in a standard synthetic reaction vessel for 24 hours at 25°C. Afterward, the products were filtered on scintered glass and washed with dimethylformamide, ethanol, acetic acid, EtOH, and then methylene chloride. This method esterifies about 0.3 m moles – 0.4 m moles leucine to the resin.

Addition of Subsequent Amino Acids:

4.0 g of the resulting Boc-leucine-resin was placed in a standard reaction vessel and the appropriate amino acids were successively coupled to the amino end of the growing peptide chain. All couplings were mediated by dicyclohexylcarbodiimide (DCC) activation excepting those for Boc-asparagine and Boc-glutamine, which were coupled as their active p-nitrophenyl esters. The DCC-couplings employed a 3-fold excess of Boc-amino acid and DCC in methylene chloride and a reaction time of 2 hours. Because of its low solubility in methylene chloride, Boc-($NO_2$)-arginine was dissolved in a minimum amount of dimethyl formamide and diluted with methylene chloride. The active esters were coupled in dimethylformamide using a 5-fold excess of reagent for 20 hours.

The Boc-groups were removed at the beginning of each cycle of the synthesis by treatment with 25% trifluoroacetic acid (TFA) in methylene chloride for 30 min. The side chain protecting groups used — glutamic acid (benzyl ester) [Glu (OBzl)], tyrosine (benzyl ether) [Tyr (Bzl)], lysine (carbenzoxy) [Lys (Z)], arginine (nitro) [Arg($NO_2$)] — are known to be stable to this treatment.

The steps involved in one cycle of the DCC-mediated coupling and one cycle of the active ester coupling are shown in Charts I and II, respectively. The peptide in the Boc-form was deblocked, the resulting TFA salt was neutralized, and the N-terminal free base was then coupled to the protected amino acid. Excess reagents and by-products were removed by washing with methylene chloride, ethanol, and dimethyl formamide.

In this synthesis, 0.4 m moles of Boc-leucine were esterified to each gram of the resin of which 4.0 g were charged to the reaction vessel. The next 12 amino acids were coupled one at a time to the amino terminus of the growing peptide; the amounts of each and the order is shown in Chart III along with the method of coupling used.

Cleavage From Resin

After completion of the synthesis, the protected tridecapeptide was cleaved from the resin using an HBr solution. The resin was swollen in a small amount of $CH_2Cl_2$ and suspended in anhydrous TFA (10 mls per g. of resin). To prevent bromination of tyrosine residues, 100 moles of anisole was added per mole of peptide and a stream of HBr gas was bubbled through the suspension. The HBr was first purified by passage through solutions of resorcinol in TFA. After 90 min., the suspension was filtered on scintered glass and the resin washed 3 times with TFA (10 mls/g.). The filtrate was rotary evaporated several times. All of the protecting groups were removed by this treatment except the $NO_2$ functions on the arginine residues.

Hydrogenation

Catalytic hydrogenation to remove $NO_2$ groups was performed in a Paar hydrogenator using 5% palladium in barium sulfate as catalyst. Peptide, at a concentration of 10 mg per ml in methanol: acetic acid: water (10:1:1), was shaken with an equal weight of catalyst for 72 hours under hydrogen at a pressure of 6 atmospheres. The mixture was then filtered through Whatman No. 1 and the filtrate rotary evaporated, dissolved in water, and lyophilized. The cleavage and hydrogenation described above are schematically shown in Chart IV.

Enzymatic Results

Similar results were obtained when the synthetically obtained tridecapeptide of the invention underwent the enzymatic studies as described in Section A and "total enzymatic" digestion as described in Section B.

Chromatographic Procedure

The tridecapeptide was synthesized in the 1-glutamine form; however, during removal of the protecting groups, partial cyclization to the 1-pyrrolydonyl form was found to have occurred. Hence, it appears that two major products result from this synthesis. Further conversion to the 1-pyrrolydonyl form can be effected by incubating the synthesized product at 40°C in 4 N acetic acid at a concentration of 10 mg/ml for 40 hours. Both forms of the tridecapeptide; i.e., the 1-glutamine form and the 1-pyrrolydonyl form, can be separated and each obtained in pure form by utilizing the chromatographic procedures as described in Section A above. The two, final products were analyzed and shown to have the following amino acid sequences:

1-Glutaminyl form Gln-Leu-Tyr-Glu-Asn-Lys-Pro-Arg-Arg-Pro-Tyr-Ileu-Leu

1-Pyrrolydonyl form PCA-Leu-Tyr-Glu-Asn-Lys-Pro-Arg-Arg-Pro-Tyr-Ileu-Leu

SECTION D

Pharmacological Effects of the Chemically Synthesized Tridecapeptide Compared With Those of the Hypothalamic Substance, Neurotensin Although neurotensin was detected and isolated on the basis of its vasoactive properties in rats, further investigation of its pharmacological properties revealed that the hypothalamic substance possessed biological activity in many diverse systems. The spectrum of the biological actions of this hypothalamic substance not only classify it as a "kinin", but also distinguish it from any other known hypothalamic substance oof mammalian origin. Many of the pharmacological effects of neurotensin became apparent after its injection into the circulation of rats. In addition, rat plasma is capable of inactivating the hypothalamic substance, and possibly controlling its blood levels. Some of the more prominent biological properties of the hypothalamic substance and the tridecapeptide in the 1-pyrrolydonyl form, as well as some of the synthesized peptide fragments, are discussed in more detail hereinbelow:

Materials

Animals:

Albino rats of various sizes and female guinea pigs weighing about 300 g were obtained and hypophysectomy was performed on them.

Drugs and Hormones:

The following drugs were obtained and used:

Propranolol HCl, atropine sulfate, tryptamine HCl, secretin, bradykinin, oxytocin, histamine, serotonin, physalaemin, phenoxybenzamine, isoproteronol, hexamethonium chloride, acetylcholine chloride, pyrilamine maleate, tyramine, insulin, ACTH (Acthar), sodium pentobarbital (Nembutal), and, sodium heparin.

Reagents:

The following reagents were used in addition to those already identified hereinabove: o-toluidine, spectro grade isooctane, reagent grade sulfuric acid, $C^{14}$-D-Glucose (223 mC/mM), and Aquasol.

Methods

Rat Blood Pressure

The effects of pretreatments with various drugs on the response to the tridecapeptide was examined by the following procedure, each drug being tested in a separate rat: The animal was first shown to be responsive to an appropriate agonist in a dose producing a deviation of 30–40 mm Hg; then, 40 minutes after administration of the blocking agent, the effect of the agonist was shown to be completely inhibited. Shortly afterward, the tridecapeptide or the pure hypothalamic substance was tested in the same rat. The drugs, atropine sulfate (35 mg/kg), propranolol (5 mg/kg), and phenoxybenzamine (10 mg/kg) were administered subcutaneously to prevent the cardio-vascular responses to the agonists, acetylcholine (0.5 $\mu$g/kg), isoproterenol (0.5 $\mu$g/kg), and epinephrine (1.0 $\mu$g/kg), respectively. Any component of the response to the peptide mediated via cholinergic, beta-adrenergic, or alpha-adrenergic receptors in the vasculature would, thus, be inhibited in such rats. Hypophysectomized rats were used within 24 hours of operation and acute bilateral adrenalectomy was performed. Rats were injected once with resepine in physiological saline (7 mg/kg) 24 hours before use in order to deplete their catecholamine stores.

Smooth Muscles in an Organ Bath

The contractility responses of the following freshly dissected smooth muscle preparations to added samples of the tridecapeptide were examined: guinea pig ileum, rat duodenum, and rat uterus. Rat uteri were taken from virgin rats determined to be in proestrous by their vaginal smear. All tissues were suspended in a 40 ml bath containing physiological solutions maintained at 37°C. and aereated with a mixture of $O_2:CO_2(95:5)$. Uterine contractility was examined in modified Locke solution, while all other tissues were bathed in Tyrode's solution. All muscles were allowed to equilibrate in the bath for 30–40 minutes before the experiments were started; the effects of added drugs on the response to the tridecapeptide was examined after a 20–30 min. incubation period. Isotonic contractions of the muscles under a tension of 1 g. were registered on a kymograph with a frontal level giving a 5-fold magnification. The responsiveness of each tissue to standard solutions of the synthetic peptides, bradykinin and substance-P, were always tested. The data obtained were representative of 5–15 separate preparations of each tissue.

Vascular Permeability

The effect of neurotensin on vascular permeability was measured using Evans blue dye, a dye that readily binds to plasma proteins, particularly albumin. Groups of rats anesthetized with Nembutal (45 mg/kg) were injected intravenously with 2 ml/kg of a 1% solution of Evans blue dye in 0.85% saline. Five minutes later, 0.85% saline, or the hypothalamic substance, or the tridecapeptide, in a 0.85% saline, was injected either intravenously or intradermally. After intravenous injection, the effect of neurotensin on the skin color of test animals was visually observed and compared to that of the control animals. After intradermal injections, the patches of skin around the injection sites, each weighing approximately 300 mg, were removed after 30 minutes and the dye that had infiltrated the tissue was extracted with formamide and quantitated spectrophotometrically.

$pO_2$, $pCO_2$ and pH Measurements In Whole Blood

Whole blood obtained anaerobically was assayed for $pO_2$, $pCO_2$, and pH at 37°C. in an Instrumentation Laboratory Analyzer. Female albino rats, 90–130 g, were anesthesized with pentobarbital intraperitoneally (45 mg/kg) 40 minutes before use. The rats were then injected intravenously via tail vein with 0.85% saline, or with neurotensin in saline, and arterial blood was withdrawn from the abdominal aorta into heparinized syringes at various times after injection. Bloods were kept in ice-water until the analyses were done.

Measurement of Plasma Corticosterone Levels

Female Charles River albino rats weighing between 80 and 120 g were preselected a day prior to the experiment and housed 3 to a cage in a closed room to minimize external stress. Purina rat chow and tap water were available ad lib and artificial lighting was supplied from 6:00 a.m. to 6:00 p.m. All experiments took place between 9:00 and 10:30 a.m., a time when the diurnal variation of plasma corticosterone levels was in the low phase. Hypophysectomized rats were used within 24 hours of operation. All rats were anesthesized with pentobarbitol intraperitoneally (45 mg/kg body weight) and 15 minutes later, test solution or 0.85% saline was administered intravenously via tail vein. Some of the rats received morphine sulfate (10 mg/kg body weight) intraperitoneally 10 minutes after Nembutal, followed in 10 minutes by test solution or control. Exactly 15 minutes after injection of test materials, rats were sacrificed and trunk blood was collected in acid-washed centrifuge tubes containing 50 units of heparin to prevent clotting. The blood samples were centrifuged 10 min. at room temperature (International centrifuge at 3,000 rpm) and the clear plasma fractions isolated. Corticosterone concentrations were determined by the modified sulfuric acid fluorescence method, using a Farrand model A fluorometer.

Direct microinjection of test material into the anterior pituitary was performed, the pharmocological preparation involved pretreatment of the rats with corticosteroids (dexamethasone phosphate) to prevent the ACTH release that might result from the stressful operation.

Measurements of Plasma Glucose, Liver Glycogen and Glycogen Phosphorylase Activity Female Charles River albino rats were used for all experiments; they were maintained on a 12 hr. light cycle and given tap water and rat chow ad lib. All experiments were performed between the hours of 9:00 and 12:00 A.M., a time during which blood sugar levels of fed rats were shown to be stable. Fed rats were used rather than the standard 24 hour fasted rats since variability to the response in fasted rats was noted, especially in smaller animals.

Experiments involving groups of animals employed 90–120 g rats and the following procedure: The animals were anesthesized with pentobarbitol (45 mg/kg) and after intravenous injection of test material or physiological saline, trunk blood was collected into heparinized tubes after sacrifice and the isolated plasma fractions were analyzed for glucose content.

Single animal experiments involved larger rats, weighing 250–330 g. Each animal was anesthesized with Nembutal (45 mg/kg) and a PE-50 catheter attached to a Hamilton MFF 3-way valve with provisions for 2 syringes was inserted into the carotid artery. One syringe was used for withdrawal of blood samples and the other for administering heparinized saline. Test samples in physiological saline were injected or infused through a cannula in the femoral vein. In a typical experiment, a 0.35 ml blood sample was withdrawn through the arterial cannula into a heparinized syringe 3–10 min. prior to administration of test sample or control saline and every 5–10 min. thereafter. In order to minimize the effects of blood removal, each blood sample was replaced with an equal volume of heparinized saline, and the total volume of blood removed was always less than 10% the estimated blood volume of the rat. Each blood sample was centrifuged 10 min. at room temperature and the clear plasma fractions isolated. Glucose concentrations were determined by the colorometric method scaled down to measure 50–100 $\mu$l of plasma.

In the experiment where glucose-$C^{14}$ disappearance from plasma was evaluated, the rat was set up as described in the preceding section and one microcurie of glucose-$C^{14}$ was injected into the exposed femoral vein, followed in 2.5 min. by the test sample or control saline. Blood samples of 0.3 ml were then withdrawn every 2.5 min. afterward through the carotid cannula and replaced each time with an equal volume of saline. A 0.1 ml of each plasma fraction was then added to 10 mls of Aquasol counting solution and counted in a Packard tri-carb liquid scintillation counter for 10–100 minutes.

Glycogen concentration was determined in duplicate samples using a modification of the method described by Montgomery. Placental tissue was placed in boilding 30 percent (w/v) KOH containing 0.5 percent $Na_2SO_3$, digested, and the glycogen precipitated with ethanol. The glycogen concentration was quantitated colorimetrically with appropriate standards using a phenol-sulfuric acid mixture. Results are expressed as milligrams of glycogen per gram wet weight of tissue.

Phosphorylase activity was assayed by measuring the incorporation of labeled C-14 glucose-I-phosphate into glycogen. Enzyme activity was determined in the presence and absence of adenosine 5'-phosphate using the following reaction mixture: 100$\mu$L. of a 5 percent (w/v) placental homogenate in 0.25 M sucrose containing 1.7 mM EDTA and 0.01 M NaF added to a solution of 0.01 M NaF, 26 mM glucose-I-phosphate, 0.42 percent glycogen, 9.0 mM 5' AMP (when required), .035 M beta-glycero-phosphate pH 6.1, .008 M reduced glutathione annd 0.05 $\mu$Ci [U-C-14] glucose-I-phosphate (200 mCi/mM) in 0.3 ml. total volume. The mixture was incubated for ten minutes at 37°C. and the reaction was stopped with 1 ml. 30 percent (w/v) KOH with 1 mg. glycogen/ml. as carrier. Radioactive glycogen was isolated as described for the synthetase enzyme assay. A unit of enzyme activity was expressed as I $\mu$mole glucose incorporated per gram wet tissue per hour. By subtracting the 5' AMP independent activity of phosphorylase a from the total activity(t), one may calculate the activity of the dependent phosphorylase b form. Enzyme activities calculated per milligram protein did not differ statistically from the activity patterns observed using wet weight as the denominator. Total protein was determined by the method of Lowry, Rosebrough, Farr and Randall with bovine serum albumin as a standard. All synthetase and phosphorylase assays were done in quadruplicate.

Measurement of Plasma, Leuteinizing Hormone (LH) and Follicle Stimulating Hormone (FSH), Levels Rat LH and FSH levels were measured by radioimmunoassay using known double antibody techniques. The values obtained are expressed in terms of NIAMD-Rat-LH-RP-1 (biological potency = approximately 0.03 × NIH-LH-Sl) and NIAMD-Rat-FSH-RP-1 (biological potency = 2.1 × NIH-FSH-Sl).

Measurement of Cyclic AMP and Luteinizing Hormone Releasing Factor (LHRF) Levels The extraction as well as the assay for pituitary cyclic AMP was performed as described by T. Makino, *Am. J. Obstet Gynecol*, 115, 606–614 (1973). The production of antiserum to Luteinizing Hormone-Releasing Factor (LH-RF) was identical. The assays for LH-RF were performed as follows: hypothalamic fragments were homogenized with 0.5 ml of 0.2 M acetic acid in glass homogenizers. After centrifugation (18,000 × g at 4°C.) the supernatant fluid was boiled for 10 min. and lyophilized. The lyophilized samples were dissolved in 0.2 M Trisacetic acid buffer, pH 7.3, and assayed for LH-RF by radioimmunoassay. Five $\mu$g of LH-RF were iodinated with 1 mCi $^{125}$I and purified on Bio-Gel P-2 column (50–100 mesh, column size 0.9 × 15 cm) using 0.2 M Tris-acetic acid buffer as the eluent. The radioimmunoassay was carried out in 0.2 M Tris-acetic acid buffer, pH 7.3, continuing 1% normal rabbit serum. Two hundred $\mu$l of anti LH-RF rabbit antibody diluted 1:3000 (a dilution at which 30–45% of $^{125}$I LH-RF was precipitated by an excess amount of sheep anti-rabbit gamma globulin) was added per tube. This antibody showed no cross-immunoreaction with substance P, dopamine, oxytocin, (arg) vasopressin, (lys) vasopressin, rat Lh and FSH in amounts of 1–50 ng.

Measurement of Ganadotropic Hormone Release In Vivo and In Vitro

Sixty to eighty-day old normal cycling female Charles River rats were used in in vivo experiments. These animals were ovariectomized under ether anesthesia and kept in cages for 2–3 weeks. Twenty-five mg of progesterone and 50 $\mu$g of estradiol benzoate in sesame oil were injected subcutaneously 48 hrs. before experiments.

Plasma LH and FSH levels were examined 15, 30 and 60 min. after intravenous injection of either neurotensin (100–200 pmoles/100 g), substance P (112 pmoles/100 g), bradykinin (1000 pmoles/100 g), or 0.85% saline. The samples to be tested were administered via tail vein and after decapitation trunk blood was collected into centrifuge tubes containing about 100 U sodium heparin. Plasma was obtained by centrifugation of the samples for 10 min. at 700 g and kept frozen until assayed.

The rate of dissappearance of $I^{125}$-LH from plasma was measured in normal male rats anesthetized with pentobarbital (45 mg/kg) and injected with either neurotensin (200 pmoles/100 g) or 0.85% saline. The femoral vein was cannulated for withdrawal of blood samples while test samples were administered via tail vein. At time zero a mixture of 0.2 $\mu$Ci $^{125}$-I-LH/kg body weight (specific activity = 300 $\mu$Ci/ g) and either 0.85% saline or neurotensin in saline (200 pmoles/100 g body weight) was injected via tail vein. Blood samples of 0.3 ml were collected at 15 minute intervals thereafter, and 0.1 ml of plasma was counted in a gamma scintillation spectrometer for 1–5minutes.

Hypothalamic LH-RF levels were examined 20 min after intravenous injection of either neurotensin (100 pmoles/100 g) or 0.85% saline. After sacrifice of the animals, hypothalamic tissue, about 4 mm in thickness bounded by the optic chiasma anteriorly, by the hypothalamic fissure laterally, and by the mammillary bodies posteriorly, was quickly excised and frozen in liquid nitrogen.

Male rats of the Sprague-Dawley strain weighing 200–220 gm were used as donors of pituitary glands for incubation. Eight pituitary halves were placed in 25 ml Erlenmeyer flasks containing 2 ml of tissue culture medium 199, the other halves were placed in another flask and incubated as controls. The incubations were carried out in an atmosphere of 95% $O_2$ – 5% $CO_2$ in a Dubnoff metabolic incubator at 37°C with constant shaking at 60 cycles/min. After a 30 min preincubation period, the medium was discarded and the incubation was continued with the new medium. In those experiments in which FSH and LH were measured, 85 ng of neurotensin or 20 ng of LH-RF were added to the experimental flasks, the incubations were carried out for 4 hr, and both the tissue and the medium assayed.

In experiments in which pituitary 3'5' adenosine monophosphate (cyclic AMP) was measured, 15 ng of neurotensin or 3 ng of LH-RF were added to the experimental flasks following a 30 min preincubation period and the incubations carried out for 10 min. The pituitary tissue was collected, extracted and assayed.

Measurement of Urine Flow Rates and Sodium Output

The effect of intravenously administered tridecapeptide on urine flow and sodium output was measured in male rats weighing 200–300 g. After an overnight fast, each rat received, by gavage, 5% its weight of a 15% ethanol solution, followed in 30 min. by 3% its weight of warm tap water. The ethanol served as an anesthetic and to inhibit the secretion of antidiuretic hormone. A ligature was then tied to occlude the urethra and a PE-50 catheter was placed into the urinary bladder. Urine was collected at 10 min. intervals and experiments commenced after about 30 min. when urine flow reached a constant rate.

Test materials, dissolved in physiological saline, were infused into the femoral vein at rates varying from 0.01–0.20 ml/min. Urine sodium concentrations were measured using a Baird Atomic Model KY flame photometer and sodium output is expressed in units of $\mu$eq/min.

Results

The results obtained from testing the pure, isolated hypothalamic substance, neurotensin, and the chemically synthesized tridecapeptide of the invention according to the methods described above are set forth hereinbelow. The significance of these results will be more fully appreciated when considered in light of some of the biological properties of neurotensin as compared with those of several other vasoactive peptides as shown in Table 8.

Vasodilation and Peripheral Stasis

On intravenous injection of pure hypothalamic substance at doses of 0.02 nmoles/100 g. into anesthesized rats, the exposed cutaneous regions were observed to "flush" momentarily. The intensity and duration of this flare were roughly proportional to the dose. It is believed that this may be due to a decreased peripheral resistance as manifested by the associated fall in blood pressure and may be associated with arteriolar vasodilation. Animals receiving doses larger than 0.06 nmoles/100 g. became cyanotic in appearance for 5–20 minutes, probably due to a stagnation of blood in the peripheral tissues. That the rats' blue coloration is due to peripheral stasis and not to an impairment of oxygen exchange in the lung was shown by the fact that arterial $pO_2$ was not lowered during this cyanosis. When arterial blood was drawn from a control group of anesthetized rats, (9 animals), 2–3 minutes after intravenous injection with 0.85% saline, the following values (mean ± standard error) were obtained: $pO_2$ 82 ± 2 mm Hg; $pCO_2$ 38 ± 1 mm Hg; pH7 0.39 ± 0.02. Arterial blood drawn from the same experimental group of animals 1–3 minutes after intravenous injection of 2 nmoles/kg of neurotensin gave the following results: $pO_2$ 84 ± 4 mm Hg; $pCO_2$ 36±4 mm Hg; pH 7.36 ± .03.

The cyanotic effect of neurotensin may be unique to this substance and may provide a simple means of pharmocological identification. None of the following compounds displayed this action when intravenously administered to rats in doses as high as 1 mg/kg body weight: histamine, serotonin, epinephrine, norepinephrine, acetylchlorine, bradykinin, substance-P, vasopressin, oxytocin, physalaemin, ACTH, and insulin. However, the synthetic tridecapeptide was indistinguishable from the hypothalamic substance in this regard.

Rat Blood Pressure

Neurotensin is a potent hypotensive agent in the anesthesized rat, the threshold intravenous dose for a measurable response being about 100 pmoles/kg. The magnitude of the hypotensive effect depends upon the starting level of blood pressure, being diminished in rats with lower basal levels as shown in Table 9. The hypotensive effect of neurotensin exhibits acute tachyphylaxis; i.e., a second equal dose administered 1, 10 or 60 min. after an active first dose produced no effect; however, a second dose given several hours later is effective. Table 9 also shows that the hypotensive effect of neurotensin is not significantly altered by adrenalectomy, hypophysectomy or prior administration of atropine sulfate, phenoxybenzamine, or propranolol.

An examination of the effect of neurotensin on rat blood pressure revealed that it produced a biphasic response. An increase in blood pressure was consistently observed to precede the hypotensive response to intravenous injection of the peptide. The magnitude of this rise was found to be somewhat variable but did not seem to depend simply upon basal blood pressure level.

When examined in the same way, the synthetic tridecapeptide exhibited the same hypotension and blood pressure effects.

In Table 10 there are summarized the results of analysis of the blood pressure responses of rats to intravenous injections of the synthetic tridecapeptide of the invention and some of its partial sequences or peptide fragments.

The partial sequences shown in Table 10 are identified as follows:

Deca Glu-Asn-Lys-Pro-Arg-Arg-Pro-Tyr-Ileu-Leu
Octa Lys-Pro-Arg-Arg-Pro-Tyr-Ileu-Leu
Hexa Arg-Arg-Pro-Tyr-Ileu-Leu As can be seen from Table 10, the synthetic tridecapeptide is shown to be equipotent with neurotensin and the partial sequences were found to be effective at higher doses. It should be noted that, whereas the cyclized tridecapeptide possessed full activity, the 1-Gln-tridecapeptide has only 67% of the activity by this test, and the hexapeptide had about 5% activity. The initial hypertensive component of the response to the hexa- and octa-peptides was exaggerated relative to their hypotensive effects. The simplest interpretation of these data is that these 2 responses involve 2 different vascular receptors and that the partial sequences of neurotensin display varying efficacies of interaction with the 2 receptors.

As measured by its hypotensive action in rats, the tridecapeptide was found to have an apparent half life of about 20 min. in rat whole blood or plasma.

The synthetic tridecapeptide was incubated at 37°C with rat blood (plasma) at a concentration of 2 nmoles/ml and 0.1 ml samples were withdrawn at various times and tested immediately. The mechanism of this inactivation is probably enzymatic as it proceeds at a negligible rate at 0°C.

Vascular Permeability

Neurotensin can cause a marked increase in vascular permeability which is easily demonstrated. Within minutes after intravenous injection of > 500 pmoles/100 g of neurotensin into an anesthetized rat, the animal's limbs appear swollen and edematous. Intravenous injection of this amount of neurotensin into animals previously injected with Evans blue dye causes a greater leakage of the albumin bound dye into the extravascular space than is visible in the control animals. If neurotensin is given intradermally, a proportionally greater amount of extractable dye accumulates at its site of the injection than that of saline. Another indication of this increased permeability is the finding that the hematocrit of aterial blood increased from a control value (mean ± range) of 46 ± 2% in saline injected animals (5 rats) to 79 ± 9% in the experimental group (7 rats) 15 min. after intravenous injection of 1.0 nmoles/kg neurotensin. The same results were obtained when the synthetic tridecapeptide was used in the same way.

Studies on Isolated Intestinal Tissue

Neurotensin and the tridecapeptide were found to stimulate the contraction of guinea pig ileum and rat uterus and the relaxation of rat duodenum in an organ bath. Both neurotensin and the tridecapeptide were found to be as potent as bradykinin in their effect on guinea pig ileum and rat duodenum but only one fifth as potent as bradykinin on rat uterus. Moreover, these responses still occurred in the presence of atropine, tryptamine, pyrilamine, phenoxybenzamine and propranolol, showing that these effects are not mediated by acetylcholine serotonin or histamine, nor do they involve alpha- or beta- adrenergic receptors. In addition, the partial sequences or fragments identified in Table 10 were found to exhibit some of these same activities as did the dodecapeptide fragment, Leu-Tyr-Glu-Asn-Lys-Pro-Arg-Arg-Pro-Tyr-Ileu-Leu.

Effect of Neurotensin and Tridecapeptide on ACTH Secretion

1. Intravenous Injection

Intravenous injection of neurotensin and synthetic tridecapeptide into rats was found to promote the release of adrenocorticotropic hormone (ACTH) from the pituitary gland which was evidenced by a resultant increase in plasma corticosterone levels. The dose response relationship obtained 15 min. after injection of neurotensin and tridecapeptide into (a) untreated, (b) morphine pretreated, and (c) hypophysectomized rats under pentobarbitol anesthesia revealed that the tridecapeptide-or neurotensininduced increase in plasma corticosterone was abolished by prior hypophysectomy and significantly diminished by morphine pretreatment. The fact that the presence of the pituitary gland is essential for the response, suggests that ACTH is mediating the steroidogenic effect. It can be concluded from the morphine inhibition that neurotensin and the tridecapeptide were acting primarily through the central nervous system (CNS) to promote the ACTH release. The response elicited at the higher dose probably represents neurotensin and the tridecapeptide overcoming the morphine block. However, this might also be attributable to a direct effect on the pituitary. In total, the data obtained revealed that the most sensitive pathway (threshold 0.2–0.3 nmoles/kg) for stimulation of ACTH secretion by either neurotensin or the tridecapeptide involved excitation of the CNS and release of endogenous corticotropin releasing factors (CRF's).

2. Direct Intra-Pituitary Injection

That neither neurotensin nor the tridecapeptide possess CRF activity at these doses was corroborated by the results obtained upon direct microinjection of these factors into the anterior pituitary of rats. When 11 rats received 0.06 nmoles/kg of these factors by intra-pituitary injection, there was no significant difference in plasma cortocosterone levels when compared to controls at 15 min. after injection.

Hyperglycemic Effect of Neurotensin and synthetic Tridecapeptide

Neurotensin was found to produce a transient hyperglycemia within minutes after intravenous (I.V.) injection into anesthetized rats. The dose response relationship is linear over the range 20–200 pmoles/100 gm. ($\Delta$ glucose 18–145 mg %) 15 minutes after injection. Neurotensin did not alter the disappearance of $C^{14}$ glucose from plasma during the development of hyperglycemia, but caused a fall in liver glycogen (52 ± 6.5 mg/g to 41±3.3 mg/g) and a 7-fold increase in glycogen phosphorylase activity (A/B = 2.36 to 21.2). Acute adrenalectomy did not prevent the response. Hypophysectomized rats (4 days post operative) are less sensitive to neurotensin, perhaps as a consequence of their diminished liver glycogen levels (normal 52.4±6.5 mg/g, hypophysectomized 23±1.75 mg/g). Liver glycogen levels as well as the hyperglycemic response were partially restored by corticosterone replacement (1 mg/day for 4 days) indicating that the diminished response is secondary to changes following hypophysectomy but that the presence of the pituitary is not required. These findings suggest that liver glycogen metabolism may be subject to regulation by a mechanism that involves participation of this factor. The same activity was observed when the tridecapeptide was utilized in place of neurotensin.

Effect of Pure Neurotensin on the Release of Rat Gonadotropic Hormones

Intravenous injection of neurotensin (100–200 pmoles/100 g body weight) into test rats (i.e., ovariectomized female rats pretreated with estrogen and progesterone) led to a significant elevation in both plasma LH and FSH compared to test rats injected with 0.85% saline. (See Table 11).

Increased blood levels of these factors could conceivably result from their increased rates of appearance in blood, decreased rates of disappearance, or a combination of the two. The half-life of LH in the blood of anesthetized rats was found to be similar whether they are injected with 0.85% saline or neurotensin in saline in a dose that significantly elevates plasma LH levels. This result argues that the increased LH levels induced by neurotensin reflect an augmented rate of release of LH and FSH into blood.

Addition of neurotensin to pituitaries incubated in vitro to give a concentration of 25 nM, did not induce a release of either FSH or LH into the incubation medium whereas LH-RF at a concentration of 9 nM did lead to a significant increase in both FSH and LH. (See Table 12). LH-RF at a concentration of 1.4 nM caused a 9-fold increase in the concentration of cyclic AMP in pituitary glands incubated in vitro, whereas neurotensin at a concentration of 4.5 nM had no effect. (See Table 13).

Significant depletion of LH-RF in the hypothalamus was found to occur during the time that injection of neurotensin led to a rise in plasma levels of FSH and LH. One hundred picomoles of the peptide/100 g body weight injected intravenously to ovariectomized, estrogen-progesterone treated animals caused a significant decrease in the hypothalamic content of LH-RF 30 min after intravenous injection of the peptide.

The same results were evidenced when the synthetic tridecapeptide was substituted as the injection media.

Effect of Neurotensin on Urine Flow and Na+ Excretion

Intravenously administered neurotensin was found to induce antidiuresis and a decrease in sodium excretion in water-loaded, alcohol-anesthesized rats. The threshold dose for either response appears to be in the range of 0.4–0.6 nmoles/kg, which makes the hormone, on a molar basis, about 1000 times less potent than antidiuretic hormone (ADH) in this regard. The synthetic tridecapeptide produced the same results.

Hence, the synthetic tridecapeptide, like neurotensin, when administered in appropriate biological dosages, appears to be capable of activating many systems concurrently; e.g., glucose mobilization, steroid secretion, LH and FSH secretion, antidiuresis, and vascular changes. It is possible that patterned responses of this sort might be evoked by neurohormones in order to coordinate the activities of various organs of the body. Such neurohormones, regulating visceral functions, may facilitate preparation of the organism for eating, sleeping, sex, etc., and adjustment of the organism to emergency situations, such as stress, fasting, sickness, injury, etc.

From the foregoing, it will be readily appreciated that the discovery of the hypothalamic substance, neurotensin, from trace amounts available in native hypothalamic tissue, and its subsequent isolation for biological analysis marks a milestone in this art. It will be equally appreciated, however, that due to the cost and time involved in such isolation and the relatively small quantities obtainable therefrom, further isolation of this factor from its native tissue would be uneconomical and prohibitive. Yet, the biological potency of this substance has been adequately demonstrated and its chemical structure defined. Consequently, it is of paramount significance that the chemically synthesized tridecapeptide of this invention exhibits the same activity as the isolated and pure neurotensin. As has been demonstrated above, utilization of this synthetic tridecapeptide, which can now be made readily available in commercial quantities and at low cost, permits the biological effects of the naturally derived hypothalamic substance to be further studied and explored with facility by injecting biologically active doses of the synthetically produced tridecapeptide into various mammalian species.

TABLE 1

| | Summary of Purification of Neurotensin 45 kg Bovine hypothalami | | | | |
|---|---|---|---|---|---|
| Purification Step | Total Protein (mg) | Total Sialogogic Doses Recovered | Total Neurotensin Doses Recovered | Neurotensin Yield (%) | Neurotensin Specific Activity (doses/mg) |
| 80% acetone extraction | 270,000[a] | 40,000 | 15,000[c] | 100% | 0.06 |
| First gel chrom. on Seph G-25 | 10,000[a] | 33,000 | | | |
| Second gel chrom. on Seph G-25 | 1,500[a] | 30,000 | 11,000 | 75% | 7. |
| First chrom. on SE-Seph | 250[a] | 20,000 | 7,500 | 50% | 30. |
| Second chrom. on SE-Seph | 10[b] | | 6,000 | 40% | 600. |
| Paper Electrophoresis pH 3.5 | 0.3[b] | | 3,100 | 21% | 10,300 |

[a]Protein expressed as optical density units at 280 mµ
[b]Protein as calculated from quantitative amino acid analyses
[c]Calculated by assuming a 75% yield of neurotensin through the 2 initial gel chromatography stages.

TABLE 2

| Amino Acid | Molar Ratios of Amino Acids in Neurotensin After Electrophoresis | | | | | | Assumed residues per mole peptide |
|---|---|---|---|---|---|---|---|
| | Electrophoresis at pH 3.5 | | Electrophoresis at pH 3.5 then pH 6.5 | | Electrophoresis at pH 3.5 then pH 8.9 | | |
| | 13[a] | 9[a] | 25[a] | 6[a] | 7[a] | 7[a] | |
| Lys | 0.94 | 1.00 | 1.17 | 1.0 | 1.1 | 1.1 | 1 |
| Arg | 1.88 | 2.11 | 1.90 | 1.93 | 2.0 | 2.0 | 2 |
| Asx | 1.08 | 1.21 | 1.07 | 1.24 | 1.06 | 1.2 | 1 |
| Glx | 2.14 | 1.75 | 2.06 | 2.09 | 2.0 | 2.1 | 2 |
| Pro | 1.94 | 2.11 | 1.86 | 2.08 | 1.8 | 1.8 | 2 |
| Ileu | 0.93 | 0.97 | 0.99 | 0.97 | 0.97 | 0.97 | 1 |
| Leu | 1.91 | 2.02 | 1.86 | 1.95 | 2.0 | 2.1 | 2 |
| Tyr | 2.15(2.5)[b] | 2.14(2.2)[b] | 2.0(2.0)[b] | 2.0(2.1)[b] | 1.8 | 1.9 | 2 |
| Total | | | | | | | 13 |

TABLE 2-continued

| Amino Acid | Molar Ratios of Amino Acids in Neurotensin After Electrophoresis | | | | | | Assumed residues per mole peptide |
|---|---|---|---|---|---|---|---|
| | Electrophoresis at pH 3.5 | | Electrophoresis at pH 3.5 then pH 6.5 | | Electrophoresis at pH 3.5 then pH 8.9 | | |
| | 13[a] | 9[a] | 25[a] | 6[a] | 7[a] | 7[a] | |
| Specific activity (doses/mg) | 10,000 | 10,500 | 10,000 | 10,500 | 10,500 | 11,000 | |

Each column represents a separate preparation
[a] Amount of peptide per analysis (nmoles)
[b] Tyrosine determined spectrophotometrically in parentheses assuming a tyrosine extinction coefficient $E274m\mu = 1.4 \times 10^3$.

TABLE 3

Results of Dansyl-Edman Method

| Treatment | Alpha-amino Dansyl Products | Phenylthiohydantion Amino Acids (% yield) |
|---|---|---|
| PCA digest | Leu | — |
| 1 × Edman | Tyr | nd |
| 2 × Edman | Glu | Tyr (50%) |
| 3 × Edman | — | Glu (60%) |
| 4 × Edman | — | Asx (30%) |

TABLE 4

Summary of Yields and Chemical Properties of Tryptic Fragments of Neurotensin Isolated by Electrophoresis at pH's 3.5 and 6.5

| Fragment | T-1 | | T-2 | | Neurotensin and Total |
|---|---|---|---|---|---|
| Electrophoresis pH | 3.5 | 6.5 | 3.5 | 6.5 | |
| % Yield | 65% | 74% | 46% | 56% | |
| nmoles/analysis | 11 | 11 | 7 | 7.5 | |
| Amino Acid* | Ratio | Ratio | Ratio | Ratio | |
| Lysine | 1.0 | 1.0 | — | — | 1 |
| Arginine | 0.94 | 1.0 | 0.9 | 1.0 | 2 |
| Aspartic acid | 1.05 | 1.2 | — | — | 1 |
| Glutamic acid | 2.0 | 2.0 | — | — | 2 |
| Proline | 1.0 | 0.9 | 1.1 | 1.0 | 2 |
| Isoleucine | — | — | 1.0 | 0.9 | 1 |
| Leucine | 1.1 | 1.1 | 1.0 | 1.0 | 2 |
| Tyrosine | 0.9 | 1.0 | 1.0 | 1.0 | 2 |
| Total | 8 | | 5 | | 13 |
| Dansyl amino acid products | o-tyrosine E-lysine | | arginine o-tyrosine | | |

*Molar ratios

TABLE 5

Summary of the Yields and Chemical Properties of Chymotryptic Fragments of Neurotensin Isolated by Electrophoresis at pH's 3.5 and 6.5

| Fragment | C-1 | | C-2 | | C-3 | | Neurotensin and Total |
|---|---|---|---|---|---|---|---|
| Electrophoresis pH | 3.5 | 6.5 | 3.5 | 6.5 | 3.5 | 6.5 | |
| % Yield | 93% | 77% | 72% | 50% | 78% | 78% | |
| nmoles/analysis | 11 | 7 | 8 | 4 | 13 | 7 | |
| Amino Acid* | Ratio | Ratio | Ratio | Ratio | Ratio | Ratio | |
| Lysine | — | — | 1.0 | 1.1 | — | — | 1 |
| Arginine | — | — | 1.9 | 2.0 | — | — | 2 |
| Aspartic | — | — | 1.1 | 0.9 | — | — | 1 |
| Glutamic | 1.0 | 1.0 | 1.0 | 1.0 | — | — | 2 |
| Proline | — | — | 1.9 | 1.9 | — | — | 2 |
| Isoleucine | — | — | — | — | 0.9 | 1.0 | 1 |
| Leucine | 1.0 | 1.0 | — | — | 1.0 | 1.0 | 2 |
| Tyrosine | 1.0 | 1.0 | 0.9 | 1.0 | — | — | 2 |
| Total | 3 | | 8 | | 2 | | 13 |
| Dansyl-amino acid products | O-tyr — | | Glu O-tyr E-lys | | Ileu — — | | |

*Molar Ratios

TABLE 6

Results of Enzymatic Digestions:

| Treatment | Released Amino Acids (% yield) | |
|---|---|---|
| CPA (6nm)≠ | Tyr (95%) | |
| CPA and then PCA-peptidase (10nm) | Tyr (85%) | Leu (90%) |

≠Amount of peptide used

TABLE 7

| Peptide | Structure | mw | Net Charges pH 1.9 | pH 6.5 |
|---|---|---|---|---|
| Neurotensin | PCA-Leu-Tyr-Glu-Asn-Lys-Pro-Arg-Arg-Pro-Tyr-Ileu-Leu-OH | 1674 | +3 | +1 |
| T-1 | PCA-Leu-Tyr-Glu-Asn-Lys-Pro-Arg-OH | 1031 | +2 | 0 |
| T-2 | H-Arg-Pro-Tyr-Ileu-OH | 661 | +2 | +1 |
| C-1 | PCA-Leu-Tyr-OH | 406 | 0 | −1 |
| C-2 | H-Glu-Asn-Lys-Pro-Arg-Arg-Pro-Tyr-OH | 1059 | +4 | +2 |
| C-3 | H-Ileu-Leu-OH | 245 | +1 | 0 |

TABLE 8

Comparison of Biological Activities of Neurotensin With Known Vasoactive Mammalian Polypeptides.

| Test | Neurotensin | Bradykinin | Oxytocin | Vasopressin | Substance P | Angiotensin |
|---|---|---|---|---|---|---|
| Rat cyanosis | Yes | No | No | No | No | No |
| Rat blood pressure | − | − | − | + | − | + |
| Blood pressure tachaphylaxis | Yes | No | No | No | No | No |
| Capillary permeability | + | + | 0 | 0 | | |
| Rat uterus | C | C | C | C | C | C |
| Guinea pig ileum | C | C | R | C | C | C |
| Rat duodenum | R | R | R | C | C | C |
| Rat plasma corticosterone | + | + | | + | 0 | |
| Rat plasma glucose | + | + | 0 | 0 | 0 | |
| Rat antidiuresis | Yes | Yes | Yes | Yes | No | No |

+ increases
− decreases
0 not affected
R relaxes
C contracts

TABLE 9

The Effect of Various Treatments on the Systemic Blood Pressure Response to Neurotensin in Anesthesized Rats

| Treatment | Number of Animals | Basal Pressure (mm. Hg) | Rise Δ P (mm Hg) | Response* Fall Δ P (mm Hg) | Tachyphylaxis |
|---|---|---|---|---|---|
| Intact (high)+ | 18 | 108 ± 3‡ | 8 ± 1‡ | 38 ± 2‡ | + |
| Intact (low)+ | 3 | 50 (38–65) | 6 (4–8) | 15 (12–20) | + |
| Adrenalectomized | 2 | 95 (90–100) | 7 (5–9) | 37 (34–42) | + |
| Hypophysectomized | 2 | 62 (52–72) | 6 (4–8) | 25 (20–30) | + |
| Atropine | 2 | 105 (98–112) | 9 (5–13) | 40 (34–46) | + |
| Phenoxybenzamine | 2 | 80 (75–85) | 4 (2–6) | 32 (26–38) | + |
| Propanolol | 2 | 85 (79–91) | 8 (4–12) | 30 (24–36) | + |

*Response observed after intravenous injection of 0.6 nmoles/kg neurotensin. Values are the means of 2–18 determinations. The range of each distribution is given in parentheses following the mean value.
+Average starting blood pressure level (range for the group).
‡ Mean ± standard error.

TABLE 10

Comparison of the Effects of Neurotensin and Synthetic Tridecapeptide and its Partial Sequences on the Systemic Blood Pressure of Anesthetized Rats

| Treatment | Dose nmoles/kg. | Number of Animals | Basal Pressure (mm Hg) | Rise Δ P (mm Hg) | Response* Fall Δ P (mm.Hg) |
|---|---|---|---|---|---|
| Neurotensin | 0.6 | 18 | 108 ± 3 | 8 ± 1 | 38 ± 2 |
| 1-PCA-tridecapeptide | 0.6 | 2 | 103 (100–106) | 7 (4–10) | 37 (34–40) |
| 1-GLn-Tridecapeptide | 0.8 | 6 | 94 (82–110) | 11 (4–18) | 26 (20–30) |
| 1-GLn-tridecapeptide (hexamethonium)‡ | 0.8 | 2 | 86 (76–95) | 6 (5–6) | 22 (21–23) |
| 1-GLn-tridecapeptide (phenoxybenzamine)‡ | 0.8 | 4 | 90 (76–110) | 10 (4–15) | 23 (13–30) |
| Deca | 1.2 | 3 | 108 (100–110) | 5 (3–10) | 21 (8–40) |
| Octa | 6.0 | 4 | 106 (100–116) | 18 (10–22) | 18 (10–28) |
| Octa (propranolol) | 6.0 | 2 | 60 (60–60) | 12 (10–13) | 20 (19–21) |
| Hexa | 8.0 | 2 | 100 (96–105) | 26 (14–38) | 17 (11–23) |

*Response observed after intravenous injection of dose indicated.
‡ Drug pretreatment indicated in parenthesis. Values are the means of 2–18 determinations. The range of each distribution is given in parentheses below the mean value, except in the first case in which the standard error is indicated.

TABLE 11

Effect of Neurotensin on Serum LH and FSH Levels in Ovariectomized Rats Treated With Estrogen and Progesterone*

| Group | Serum LH+ (ng/ml serum) | Serum FSH+ (ng/ml serum) |
|---|---|---|
| Control (saline) | 97.6 ± 8.8 (5) | 576.0 ± 53.0 (5) |
| Neurotensin (200 picomole/ 100 g body weight) | 159.2 ± 18.9 (5)**† | 744.0 ± 40.6 (5)*** |
| Substance P (0.15 μg/100 g body weight) | 74.4 ± 6.9 (5) | 556.0 ± 37.6 (5) |
| Bradykinin (1.0 μg/100 g body weight) | 73.2 ± 3.9 (5) | 534.0 ± 33.4 (5) |

*Blood samples were collected 30 min after tail vein injection by decapitation.
**P 0.025.
***P<0.05
+Reference preparation = NIAMD-Rat LH or FSH-RP-1.
† Number of animals in parentheses.

TABLE 12

Effect of Neurotensin and LH-RF on LH and FSH Release in vitro*

| Exp. No. | Treatment | LH released in med. ng LH/mg AP | FSH released in med. ng FSH/mg AP |
|---|---|---|---|
| Exp. 1 | 85 ng Neurotensin | 2036.5 ± 184.0** | 1810.1 ± 98.2 |
|  | control | 2058.5 ± 167.8 | 1760.0 ± 164.7 |
| Exp. 2 | 20 ng LH-RF/flask | 4432.2 ± 250.1† | 2535.9 ± 192.3+ |
|  | control | 2098.5 ±71.6 | 1760.4 ±83.4 |

*The pituitary halves were incubated for 4 hrs after 30 min pre-incubation in 2 ml of TC 199.
**Mean ± S.E.
+P<0.001
† O<0.025

TABLE 13

Pituitary Contents of Cyclic AMP After 10 min Incubation With Neurotensin and LH-RF*

| Exp. No. | Treatment | Pituitary cyclic AMP (picomoles/mg AP) |
|---|---|---|
| Exp. 1 | 15 ng Neurotensin | 3.19 ± 0.11† |
|  | control | 3.33 ± 0.10 |
| Exp. 2 | 3 ng LH-RF | 11.8 ± 1.38** |
|  | control | 1.29 ± 0.07 |

*All pituitaries were incubated for 10 min in Krebs Ringer bicarbonate buffer (pH 7.6) after 30 min preincubation.
**P<0.025.
† Means ± S.E.

CHART I

Schedule for Solid Phase Peptide Synthesis (Diimide Coupling)

| Step | Reagent | Volume/g. | Time (Min.) |
|---|---|---|---|
| 1. | $CH_2Cl_2$ wash (3 ×) | 10 mls. | 10 |
| 2. | 25% $TFA/CH_2Cl_2$ wash | 10 mls. | 2 |
| 3. | 25% $TFA/CH_2Cl_2$ reaction | 10 mls. | 30 |
| 4. | $CH_2Cl_2$ wash (3 ×) | 10 mls. | 10 |
| 5. | ETOH wash (3 ×) | 10 mls. | 10 |
| 6. | DMF wash (3 ×) | 10 mls. | 10 |
| 7. | 10% $Et_3N$/DMF wash | 10 mls. | 2 |
| 8. | 10% $Et_3N$/DMF reaction | 10 mls. | 10 |
| 9. | DMF wash (3 ×) | 10 mls. | 10 |
| 10. | $CH_2Cl_2$ wash (3 ×) | 10 mls. | 10 |
| 11. | Boc-AA $CH_2Cl_2$ | 7 mls. | 5 |
| 12. | $DCC/CH_2Cl_2$ | — | 120 |
| 13. | $CH_2Cl_2$ wash (3 ×) | 10 mls. | 10 |
|  |  | Total | 239 |

CHART II

Schedule for Solid Phase Peptide Synthesis (Active Ester Coupling)

| Step | Reagent | Volume /g. | Time (Min.) |
|---|---|---|---|
| 1. | $CH_2Cl_2$ wash (3 ×) | 10 | 10 |
| 2. | 25% $TFA/CH_2Cl_2$ wash | 10 | 2 |
| 3. | 25% $TFA/CH_2Cl_2$ reaction | 10 | 30 |
| 4. | $CH_2Cl_2$ wash (3 ×) | 10 | 10 |
| 5. | ETOH wash (3 ×) | 10 | 10 |
| 6. | DMF wash (3 ×) | 10 | 10 |
| 7. | 10% $Et_3N$/DMF wash | 10 | 2 |
| 8. | 10% $Et_3N$/DMF reaction | 10 | 10 |
| 9. | DMF wash (6 ×) | 10 | 20 |
| 10. | Boc-AA active ester/DMF | 7 | 1200 |
| 11. | DMF wash (3 ×) | 10 | 10 |
|  |  | Total | 1314 min. |

CHART III

Coupling of Amino Acids

| Amino acid | Amt. (g) | Coupling Method DCC (m moles) | Active ester |
|---|---|---|---|
| Boc-Ileu | 1.3 | 5.0 |  |
| Boc-Tyr(benzyl) | 2.2 | 5.0 |  |
| Boc-Pro | 1.3 | 5.0 |  |
| Boc-Arg($NO_2$) | 1.9 | 5.0 |  |
| Boc-Arg($NO_2$) | 1.9 | 5.0 |  |
| Boc-Pro | 1.3 | 5.0 |  |
| Boc-Lys(Carbenzoxy) | 2.3 | 5.0 |  |
| Boc-Asn-nitrophenyl | 2.82 |  | X |
| Boc-Glu(benzyl) | 1.65 | 5.0 |  |
| Boc-Try(benzyl) | 2.2 | 5.0 |  |
| Boc-Leu | 1.4 | 5.0 |  |
| Boc-Gln-nitrophenyl | 3.2 |  | X |

CHART IV

Cleavage and Catalytic Hydrogenation of the Resin-Bound Protected Tridecapeptide

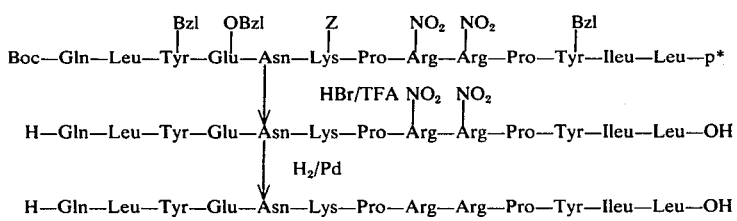

*Polymer

What is claimed:

1. The chemically synthesized tridecapeptide, pyroglutamyl-leucyl-tyrosyl-glutamyl-asparaginyl-lysyl-prolyl-arginyl-arginylprolyl-tyrosyl-ileucinyl-leucyl-OH, said tridecapeptide having the same activity as the hypothalamic substance, neurotensin.

2. The chemically synthesized tridecapeptide, glutaminyl-leucyl-tyrosyl-glutamyl-asparaginyl-lysyl-prolyl-arginyl-arginyl-prolyl-tyrosyl-ileucinyl-leucyl-OH, said tridecapeptide having an activity similar to that of the hypothalamic substance, neurotensin.

3. The chemically synthesized dodecapeptide leucyl-tyrosyl-glutamyl-asparaginyl-lysyl-prolyl-arginylprolyl-tyrosyl-ileucinyl-leucyl-OH, said dodecapeptide having an activity similar to that of the hypothalamic substance, neurotensin.

4. The chemically synthesized decapeptide, glutamyl-asparaginyl-lysyl-prolyl-arginyl-arginylprolyl-tyrosyl-ileucinyl-leucyl-OH, said decapeptide having an activity similar to that of hypothalamic substance, neurotensin.

5. The chemically synthesized octapeptide, lysyl-prolyl-arginyl-arginyl-prolyl-tyrosyl-ileucinyl-leucyl-OH, said octapeptide having an activity similar to that of the hypothalamic substance, neurotensin.

6. The chemically synthesized hexapeptide, arginyl-arginyl-prolyl-tyrosyl-ileucinyl-leucyl-OH, said hexapeptide having an activity similar to that of the hypothalamic substance, neurotensin.

* * * * *